United States Patent [19]

Maraghe et al.

[11] Patent Number: 4,479,623
[45] Date of Patent: Oct. 30, 1984

[54] SPRING OPERATED COUNTERBALANCE HINGE ASSEMBLY FOR AIRCRAFT DOORS

[75] Inventors: Alex Maraghe, Seattle; Allan W. Opsahl, Renton, both of Wash.

[73] Assignee: The Boeing Company, Seattle, Wash.

[21] Appl. No.: 448,720

[22] Filed: Dec. 10, 1982

[51] Int. Cl.$^3$ .............................................. B64C 1/14
[52] U.S. Cl. .................................. 244/129.5; 16/306; 16/278; 49/386; 49/236
[58] Field of Search .......................... 244/129.5, 118.1; 49/236–245, 37, 386, 248; 16/303–309, 312–317, 277–278, 371–374, 386, 284, 285, 282, 85

[56] References Cited

U.S. PATENT DOCUMENTS

| 10,389 | 1/1854 | Englebrecht | 16/305 |
| 12,853 | 5/1855 | Canfield | 16/305 |
| 2,183,210 | 12/1939 | Anderson | 16/278 |
| 2,751,636 | 6/1956 | Heinemann et al. | 244/129.5 |
| 2,763,900 | 9/1956 | McAfee et al. | 49/248 |
| 3,051,280 | 8/1962 | Bergman et al. | 49/249 |
| 3,289,244 | 12/1966 | Carey | 16/315 |
| 3,512,212 | 5/1970 | Inoue et al. | 16/305 |

*Primary Examiner*—Galen L. Barefoot
*Attorney, Agent, or Firm*—Hughes, Barnard & Cassidy

[57] ABSTRACT

A compact, spring operated, two-way counterbalance system is disclosed for the hinge assembly of an inwardly/outwardly moveable plug-type aircraft passenger door of the type adapted to pivot about an inwardly canted hinge axis whereby a first convolute clock-type spring member is wound during the final stages of downward door-closing movement to provide an outward biasing force for assisting on-board flight attendants in opening the door during that portion of door movement when it must move in an upward direction; and, a second convolute clock-type spring member is provided which is wound during the latter stages of door opening movement when the door is moving in a downward direction, with the second convolute spring member thus providing a biasing force for assisting the on-board flight attendant in pulling the door upwardly and away from the fuselage during upslope door-closing movement. In the exemplary form of the invention disclosed, this is achieved by providing a pair of compact, coaxial, convolute, clock-type spring members which are oppositely wound and which have their free outer ends secured to the fuselage body structure with the inner ends thereof being separably engageable with radially projecting shoulder defining means formed on the inwardly canted body-mounted torque tube. The compact nature of the spring biasing arrangement of the present invention readily permits the incorporation of more extensive bearing support surfaces for the torque tube and the necessary snubber mechanisms and the like which serve to brake or retard movement of the relatively heavy door during the downward portions of movement when the door is being closed or opened.

12 Claims, 12 Drawing Figures

SPRING OPERATED COUNTERBALANCE HINGE ASSEMBLY FOR AIRCRAFT DOORS

RELATED APPLICATIONS

Karl G. Skotte, U.S. application Ser. No. 451,809, filed Dec. 21, 1982, for "Cantilever Spring Counterbalance Hinge Assembly For Aircraft Doors".

Alex Maraghe, PCT Application No. PCT/US 82/01782, filed Dec. 21, 1982, for "Cam Operated Counterbalance Assembly For Aircraft Doors", the PCT counterpart of U.S. patent application Ser. No. 474,651.

BACKGROUND OF THE INVENTION

1. Technical Field

The present invention relates generally to plug-type aircraft doors of the type adapted to swing through an arc approximating 180° about a generally vertical axis between a fully closed position flush with the aircraft fuselage and a fully opened position wherein the door is disposed in a plane essentially parallel to the aircraft fuselage centerline and with the door's outer skin surface in face-to-face relation with the outer skin surface of the fuselage; and, more particularly, to a simple, effective, compact and improved spring operated counterbalance hinge assembly for assisting on-board flight attendants who are required to manually open and close such doors—doors which today often weigh in excess of 300 pounds—and who, in the performance of their duties, must lift the relatively heavy door upwardly while simultaneously pushing outwardly to open the door and, similarly, must again lift the door upwardly while simultaneously pulling the door towards a closed position. Such movement of the door, which presents difficult and awkward problems for on-board flight attendants, is necessitated because the hinge axis for such doors must be inwardly canted from true vertical so that the operating components of the hinge assembly can be mounted within the curved configuration of the fuselage body structure.

2. Background Art

Conventional commercial aircraft are commonly provided with a multiplicity of ingress and egress openings in the aircraft fuselage with suitable doors being provided for closure of such openings. The doors vary widely in terms of their construction and operation. Commonly, such doors are plug-type doors which are designed to fit into the ingress/egress openings when the doors are closed so as to form a substantially smooth, continuous, uninterrupted, exterior skin surface. When such doors are opened, they are pivoted about the axis of a first torque tube assembly mounted in the door and moved slightly inboard, at which point the doors are pivoted simultaneously about the axes of both the first door-mounted torque tube assembly and a second torque tube assembly mounted in the fuselage body structure and to which the door is hingedly connected, with the door moving outwardly through the ingress/egress opening, and swinging through an arc approximating 180° so that when fully opened, the door is entirely disposed outside of the aircraft fuselage, lying in a plane generally parallel to the aircraft centerline and with the door's outer skin surface essentially in face-to-face contact with the outer skin surface of the fuselage. In most instances today, such doors are manually operated by on-board flight attendants since most commercial aircraft carriers are reluctant to rely upon electrical actuating systems which are subject to electrical malfunction.

Moreover, as is well known to those skilled in the art, plug-type doors of the foregoing type, since they are required to conform in construction to the shape of the fuselage while providing access to the passenger compartment in the upper lobe of the aircraft, do not and cannot lie in a vertical plane either when fully closed or when fully opened; but, rather, they lie in a curvilinear plane having an inwardly canted chord line. As a consequence, the hinge assembly, including the fuselage mounted torque tube assembly, which must be entirely confined within the aircraft body structure, is inwardly canted from true vertical, often defining acute angles with the vertical of up to on the order of from 7° to 10°, or slightly more. This, of course, means that when the door is opened and pivoted through an arc about the generally vertical, inwardly canted hinge axis, the door must be initially pushed outwardly while it simultaneously moves upwardly; and, once it has moved through approximately two thirds of its permissible pivotal movement, the door begins to move downwardly toward the outer skin surface of the aircraft fuselage. Conversely, when the door is closed, it must be pulled upwardly and away from the aircraft fuselage; and, when it has transitted approximately one-third of its arcuate movement about the inwardly canted hinge axis, the door begins to move downwardly towards and into the ingress/egress opening in the fuselage, thus closing the same. As commercial aircraft get larger and larger, such doors similarly become larger; and, consequently, the doors, together with door mounted actuating systems and the requisite emergency evacuation equipment carried thereby, have become considerably heavier, often weighing on the order of 300 pounds or more.

Thus, when an on-board flight attendant attempts to open the door manually, he or she is, in effect, required to push the relatively heavy door uphill during the intial portion of door-opening movement until such time that the door reaches the highpoint in its path of travel, at which point the weight of the door tends to swing it more rapidly downhill towards the fully open position. Even more difficult for the on-board flight attendant is the problem of closing the door which now must be pulled upwardly and away from the fuselage by the attendant, who is standing inside the aircraft, until the door again reaches its highpoint during pivotal movement about the inwardly canted hinge axis, at which point the weight of the door serves to cause it to move rapidly in a downward and inward direction towards the ingress/egress opening.

The foregoing problem tends to be uniquely applicable to aircraft where the door's hinge axis must lie within, and conform to, the chord of the curved fuselage body structure and, consequently, the hinge axis must define an acute angle with the vertical. Cabinet doors, housing doors, and similar type doors, on the other hand, do not face this type of problem because such doors are generally hinged about a truly vertical axis, thereby permitting movement of the door through the entire range of movement without having to lift the weight of the door in an upward direction during any portion of door opening or closure. Nevertheless, such doors have commonly included spring-type assist mechanisms, which have generally been provided to insure that the door is biased to at least one of a fully closed and/or a fully opened position. For example, Jordan, U.S. Pat. No. 1,028,571 and Bales et al, U.S. Pat. No. 1,831,800 each disclose arrangements wherein a door (a vehicle door in Jordan and a cabinet door in Bales et al) will generally be in a neutral unbiased position when it is halfway opened, but which moves in either direction from that neutral half opened position as a consequence of the provision of spring mechanisms which serve to bias the door from the neutral position towards both a fully opened and a fully closed position.

In Van Dillen, U.S. Pat. No. 2,028,424, a swinging door closing device is illustrated which employs a casing mounted mechanism biased by a pair of oppositely wound clock springs such that swinging movement of the door in one direction or the other tends to wind a respective one of the two clock springs to establish a restoring moment tending to bias the door towards the closed position.

Lundine, U.S. Pat. No. 2,557,749, discloses a cantilever-type spring which is mounted on a cabinet structure and which has its free end in engagement with the door. The arrangement is such that when the door is pivoted from a closed position, the spring is deflected to create a restoring moment for automatically closing the door; but, when the door is fully opened, the spring includes a detent-like arrangement for capturing the door edge and holding the door in its fully opened position.

Other patents of general interest illustrating spring-type biasing arrangements for non-aircraft doors are those found in, for example: Chamberlain, U.S. Pat. No. 2,587,287; MacDonald, U.S. Pat. No. 3,205,532; Murphy et al, U.S. Pat. No. 3,918,755; and, Wheeler et al, U.S. Pat. No. 3,115,685; the latter two patents illustrating combined spring-like camming arrangements and cam follower rollers for attaining the desired biasing motion to move a door towards a fully closed and/or a fully opened position.

Insofar as aircraft are concerned, counterbalance systems have also been known; and, they tend to vary widely dependent upon the type of door involved. In, for example, a plug-type door of the type adapted to move inwardly and upwardly along tracks disposed on the interior of the aircraft, it is common to provide a counterbalance system including cables and pulleys for minimizing the amount of exertion required to raise the heavy door upwardly along its tracks. Similarly, in Moses, U.S. Pat. No. 4,086,726, a counterbalance system is provided for an aircraft door which is intended to swing about a horizontal axis in an outward and downward direction for providing a ramp or steps permitting access to the aircraft.

In recent years, large commercial aircraft have faced problems similar to the problem faced and resolved by the present invention. In those types of door counterbalancing systems, the particular aircraft body structure has provided sufficient room to accommodate a plurality of coil springs—generally three such springs—coaxially and in generally end-to-end relation about the torque tube carried within the fuselage body structure. One of such coil springs was generally wound in a direction to permit biasing of the door in one direction during the initial portion of either door opening or closing movement, while the remaining two springs served to provide the biasing forces required during the initial portion of movement in the opposite direction. However, with present day aircraft where the doors are characterized by their large size and weight and wherein the aircraft aerodynamic contour is such that the hinge axis defines a significant acute angle, the weight of the doors has required the use of increased bearing supports, and supplemental snubber mechanisms, and the like, which provide retarding forces when the door is moving in either direction in a downward path so as to protect the door, the fuselage and the actuating mechanisms from damage due to sudden jars or shocks. Because of such mechanisms, and the constrained nature of the space within the fuselage body structure, it has been found that there simply isn't sufficient space for such coil springs in surrounding relationship to the body-mounted torque tube.

SUMMARY OF THE INVENTION

A compact, spring operated, two-way counterbalance system is provided for the hinge assembly of an inwardly/outwardly moveable aircraft passenger door of the type adapted to pivot about an inwardly canted hinge axis whereby a first spring mechanism is wound during the final stages of door-closing movement to provide an outward biasing force for assisting on-board flight attendants in opening the door during that portion of door movement when it must move in an upward direction; and, a second similar spring mechanism is provided which is wound during the latter stages of door opening movement when the door is moving in a downward direction, with the second spring mechanism thus providing a biasing force for assisting the on-board flight attendant in pulling the door upwardly and away from the fuselage during door-closing movement. In the exemplary form of the invention here described, this is achieved by providing a pair of compact, coaxial, convolute, clock-type spring members which are oppositely wound and which have their free outer ends secured to the fuselage body structure with the inner ends thereof being separably engageable with radially projecting shoulder defining means formed on the inwardly canted body-mounted torque tube. The compact nature of the spring biasing arrangement of the present invention readily permits the incorporation of more extensive bearing support surfaces for the torque tube and the necessary snubber mechanisms and the like which serve to brake or retard movement of the relatively heavy door during the downward portions of movement when the door is being closed or opened.

Accordingly, it is a general aim of the present invention to provide a simple, compact, lightweight, yet highly effective spring operated counterbalance mechanism which is capable of minimizing the exertion required by on-board flight attendants in opening and closing plug-type doors on aircraft, yet which does not occupy a significant amount of space within the aircraft body structure and which readily permits the incorporation of necessary auxiliary equipment of the type commonly associated with the hinge mechanisms for such doors.

DESCRIPTION OF THE DRAWINGS

These and other objects and advantages of the present invention will become more readily apparent upon reading the following detailed description and upon reference to the attached drawings, in which:

FIGS. 9, 10 and 11 are sectional views, respectively taken along the lines 9—9, 10—10 and 11—11 in FIG. 5, depicting details of the counterbalance mechanism of the present invention; and, FIG. 12 is a graphic representation of the forces required to open and close the aircraft passenger door when manufactured in accordance with the present invention illustrating the angular position of the door in degrees (0° representative of a fully closed door and approximately 173° representative of a fully opened door) along the abscissa, and hinge moment—i.e., the requisite force to move the door—in inch/pounds along the ordinate.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Environment Of the Invention

Figure 1:
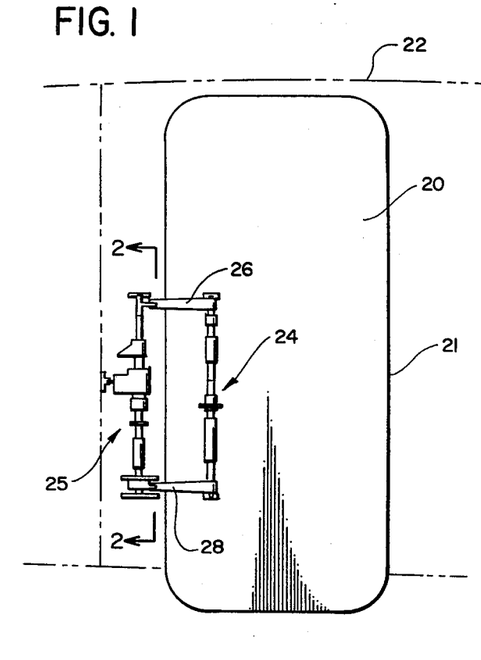
FIG. 1 is an external, highly diagrammatic, fragmentary side elevational view of a portion of a conventional large capacity passenger aircraft fuselage, shown in phantom lines, and depicting in solid lines the location of a conventional passenger plug-type ingress/egress door of the type adapted to move inwardly and outwardly during door closing and opening movements, respectively, and also depicting in solid line diagrammatic form the relative locations of the fuselage, or body-mounted, and the door-mounted torque tube assemblies which form part of a conventional door hinge assembly.
Figure 2:
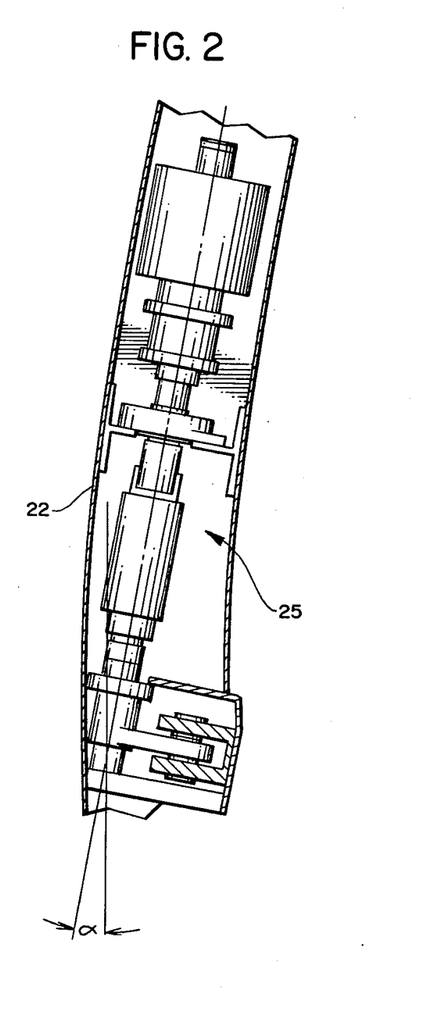
FIG. 2 is a diagrammatic sectional view taken substantially along the line 2—2 in FIG. 1 here illustrating the contour of the aircraft fuselage at the passenger ingress/egress door location wherein such contour mandates that the torque tube/hinge assembly be canted inwardly—i.e., that it be oriented at an acute angle to the vertical—thus necessitating upward movement of the door about the inclined hinge line during the initial portion of both door opening movement and door closing movement.
Figure 3:
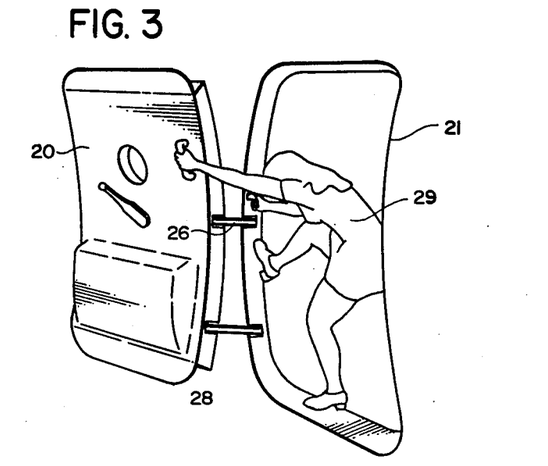
FIG. 3 is a fragmentary perspective view here depicting an on-board aircraft attendant attempting to initiate closing movement of a fully opened aircraft passenger door.

Turning first to FIGS. 1 and 2, conjointly, there has been illustrated in simplified diagrammatic form a typical aircraft plug-type door 20 of the type adapted to be swung inwardly and outwardly of the aircraft about a generally vertical axis for closing and opening an ingress/egress opening 21 formed in the fuselage 22 of the aircraft. As here illustrated, the exemplary construction includes a first door-mounted torque tube assembly, generally indicated at 24 in FIG. 1, and a second torque tube assembly, generally indicated at 25 in FIGS. 1 and 2, mounted in stationary bearings integrally secured to the fuselage 22 body structure, with the two torque tube assemblies being interconnected by upper and lower hinge arms 26, 28, respectively. As is evident upon inspection of FIG. 2, the curved nature of the aircraft fuselage 22 in the region of the ingress/egress opening 21 (FIG. 1) disposed in the upper lobe passenger compartment is such that both torque tube assemblies but, especially the body-mounted torque tube assembly 25, must be inwardly canted, defining an acute angle α with the vertical. Moreover, as will be apparent to those skilled in the art, the exemplary plug-type door 20 of the type here shown is conventionally designed to be opened by unlocking the door and rotating the door about the axis of the door-mounted torque tube assembly 24, so as to move the door inwardly into the passenger compartment from a fully closed and sealed position, at which point the door is rotated simultaneously about the axis of the door-mounted torque tube assembly 24 and the body-mounted torque tube assembly 25 with the door moving outwardly through the ingress/egress opening 21 and swinging in an arc approximating 180°—here, the arc is actually about 173°—about the hinge axis. Because the hinge axis is inwardly canted defining an acute angle α which is on the order of approximately 10°, as the door rotates it must move along an uphill slope during at least a portion of both its opening travel and its closing travel. In practice, during opening of the door, it tends to move in an upward and outward direction during the initial portion of motion through an arc approximating 123°; and, thereafter, it moves along a downward slope about the inwardly canted hinge axis through an arc of about 50° until it lies in the fully open position shown in FIG. 3. Thus, during closing movement, the on-board flight attendant 29 is required to grasp the door 20, which will generally weigh on the order of 300 pounds or more, and move it simultaneously outwardly away from the fuselage and upwardly along an inclined slope through an arc approximating 50°, at which point the door begins to move towards the ingress/egress opening 21 along a downward slope. Unfortunately, the on-board location of the flight attendant makes such door movement extremely difficult because of the exceedingly poor leverage that he or she is able to apply.

Figure 4:
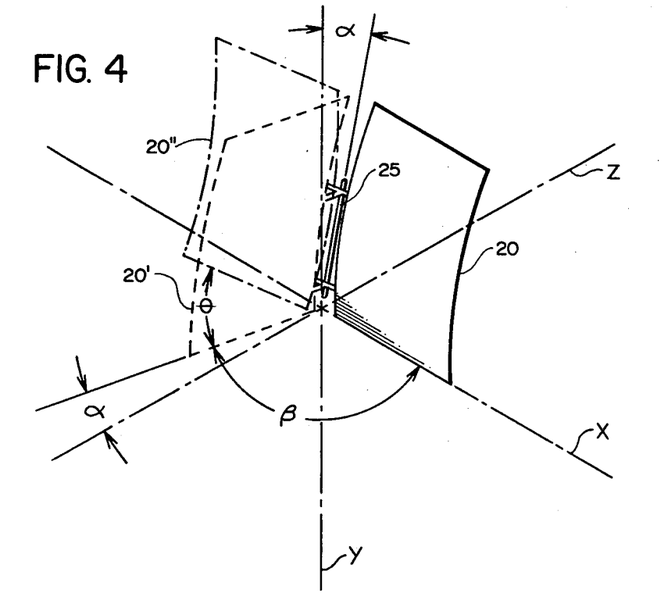
FIG. 4 is a diagrammatic perspective line drawing illustrative of the movement of a structural element—for example, an aircraft passenger door—about a simple canted or non-vertical hinge axis, and in XYZ coordinate space, between fully closed, partially closed or opened, and fully opened positions, respectively illustrated in solid lines, broken lines and dash-dot lines.

The foregoing problem may be more easily understood by reference to the diagrammatic line drawing set forth in FIG. 4 wherein a structural member such as an aircraft door 20 has been illustrated in solid lines in the fully closed position, in broken lines in the partially open position shown at 20', and in dash-dot lines in the fully open position shown at 20'', with the door being adapted for movement in XYZ coordinate space about the axis of a simple torque tube assembly 25 disposed at an acute angle α on the order of 10° with the vertical axis Y. Thus, when the door is moved from the closed position indicated at 20 to the partially open position indicated at 20', it must be moved through the angle of rotation β; and, during that portion of door movement about the inwardly canted axis of the torque tube assembly 25, the door moves uphill so that its bottom edge defines an acute angle α with the XZ plane. Continued opening movement of the door from the position 20' to the fully opened position 20" requires movement of the door through an angle of rotation θ until such time as it is fully opened, at which point its bottom edge is again generally parallel to the XZ plane. Conversely, when the door is moved from the fully open position indicated at 20" to the fully closed position indicated at 20, it first moves in an uphill direction through the angle of rotation θ; and, thereafter, the door moves downwardly through the angle of rotation β until fully closed. During downward movement of the door through the angle β in closing and the angle θ in opening, the weight of the door tends to aid in door movement; but, during upward movement of the door through the angle β when the door is opening and through the angle θ when the door is closing, the weight of the door functions to resist the forces applied by the attendant to move the door. Accordingly, the present invention is concerned with a counterbalance mechanism that tends to minimize or counterbalance the resistance forces created by the weight of the door as the on-board flight attendant moves the door through its upward paths of movement in both a door opening and a door closing mode of operation.

Counterbalance Mechanism Embodying the Present Invention

Figure 5:
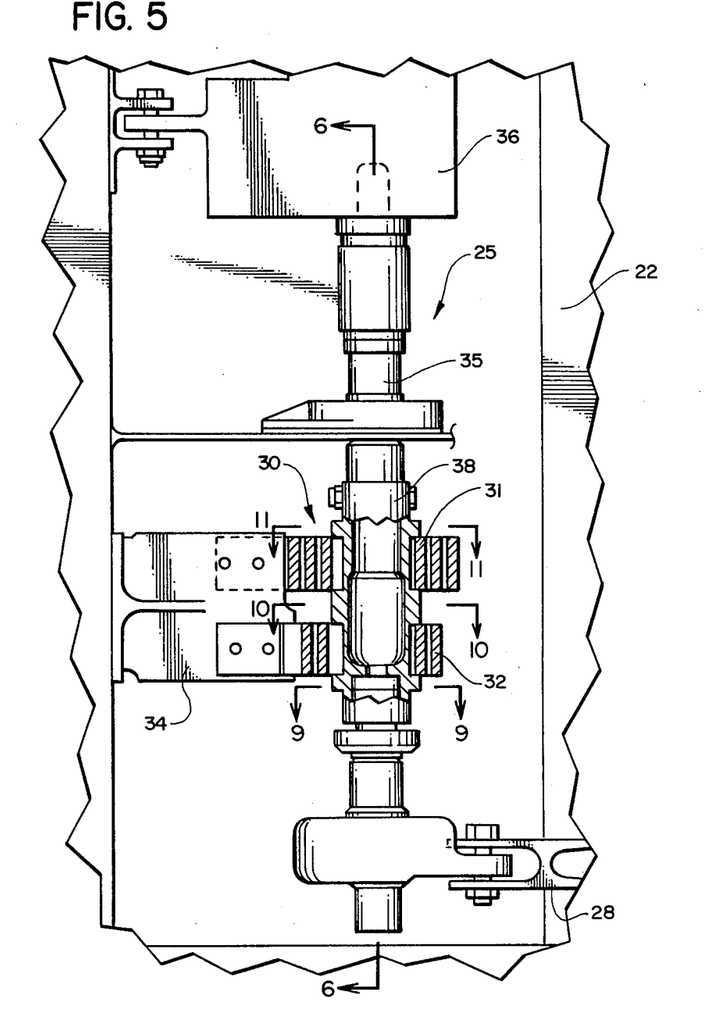
FIG. 5 is a fragmentary side elevational view, partially in section and with parts removed for purposes of clarity, here illustrating a portion of the aircraft passenger door hinge assembly including particularly the fuselage or body-mounted torque tube assembly and a counterbalance mechanism embodying features of the present invention for minimizing the amount of manual exertion required to open a fully closed door and close a fully opened door.
Figures 6, 7:
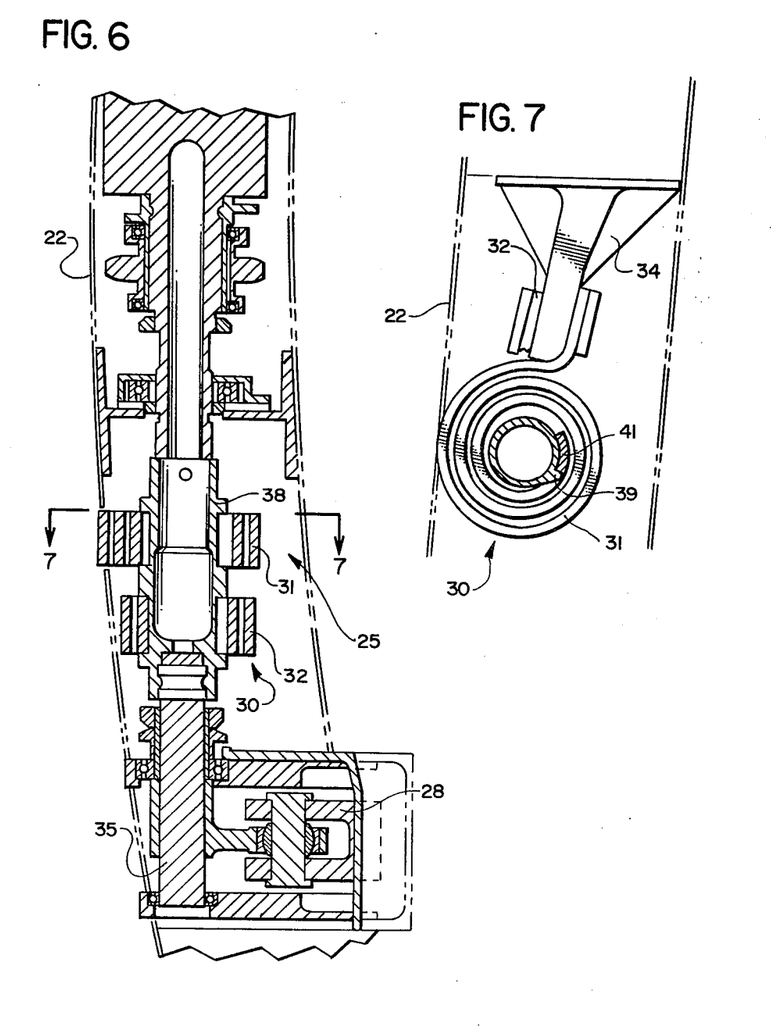
FIG. 6 is a sectional view taken substantially along the line 6—6 in FIG. 5, here illustrating details of the body-mounted torque tube assembly.
FIG. 7 is a sectional view taken substantially along the line 7—7 in FIG. 6, here illustrating details of the spring mounting arrangement for the counterbalance mechanism of the present invention.
Figure 8:
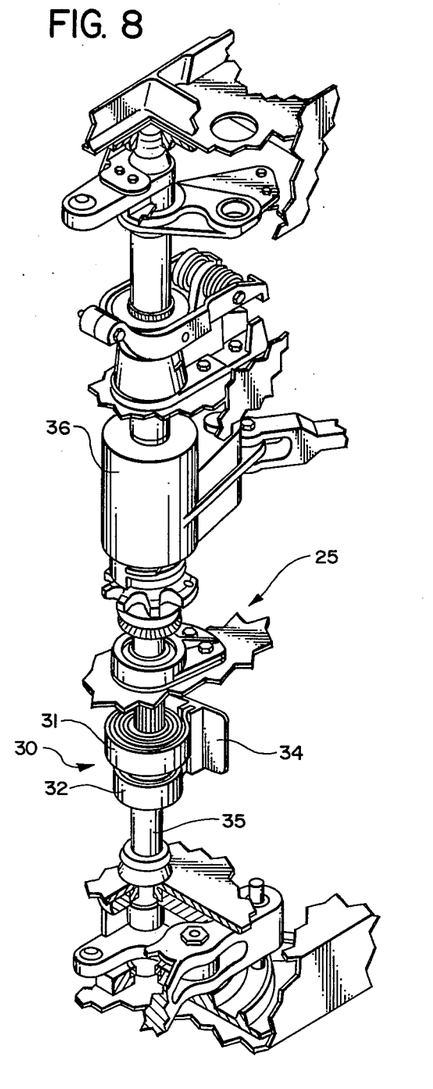
FIG. 8 is a fragmentary perspective view illustrating details of the body-mounted torque tube assembly and counterbalance mechanism of the present invention.
Figure 9:
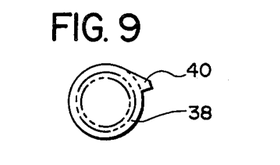
Figure 10:
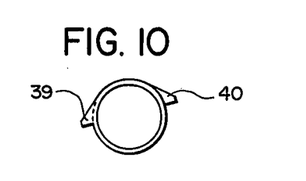
Figure 11:
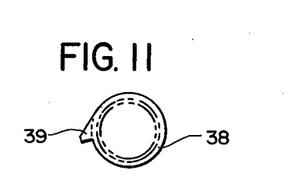

In accordance with the important aspects of the present invention, and as best illustrated by reference to FIGS. 5 through 11 conjointly, a simple, highly effective, compact, spring operated counterbalance mechanism, generally indicated at 30 in the drawings, is provided for establishing a negative hinge moment which counteracts the positive hinge moment attributable to the weight of the door during movement of the door along upward slopes as the door rotates about the inwardly canted hinge axis during both door opening and door closing movement. To this end, there has been provided upper and lower, oppositely wound, convolute clock-type spring members 31, 32, respectively, each having their outer free ends rigidly secured to a bracket 34 integral with the fuselage body structure 22, as best illustrated in FIGS. 5 and 7. As here shown, the oppositely wound convolutions of the spring members 31, 32 are coaxially disposed in surrounding relation to the torque tube 35 associated with the body-mounted torque tube assembly 25. The torque tube assembly 25 further includes a conventional snubber mechanism 36 which functions in a manner well known to those skilled in the art to retard and brake the door 20 as it moves through its downwardly sloped paths of movement during both door opening and door closing movement.

In carrying out the present invention, the torque tube assembly 25 includes a cylindrical fitting 38 which is nonrotatably secured to the torque tube 35, with the fitting 38 defining radially extending shoulders 39, 40 (best illustrated in FIGS. 7 and 9 through 11) which are respectively separably engageable with the free inner ends of the upper and lower convolute spring members 31, 32. Thus, the arrangement is such that when the aircraft door 20 is moving through the angle of rotation β angle (FIG. 4) in a downward closing direction, shoulder 39 (FIGS. 7, 10 and 11) on fitting 38 engages upper and lower projections 41 formed on the free inner end of spring 31. As the door continues to close—i.e., as it moves in a counterclockwise direction as viewed in FIG. 7—the torque tube and fitting 38 integral therewith also move in a counterclockwise direction, thereby winding the spring 31 tightly about the fitting 38 and storing energy therein. Consequently, when the on-board attendant attempts to open the fully closed door and move the door outwardly and upwardly through the angle β (FIG. 4), the now fully wound spring 31 attempts to unwind and, through interaction between the projections 41 on the inner end of the spring 31 and the shoulders 39 on fitting 38, applies torque tending to rotate the fitting 38 and, therefore, the torque tube 35 in a clockwise direction as viewed in FIG. 7. As the door reaches the highpoint in its path of opening movement and commences to move downhill through the angle θ (FIG. 4), the shoulders 40 (FIGS. 9 and 10) on fitting 38 similarly engage the free end of the lower spring 32 and serve to wind that spring tightly about the fitting, thus storing energy in spring 32. Consequently, when the on-board attendant attempts to close the door and move it upwardly through the angle of rotation θ (FIG. 4), spring 32 applies a counterbalancing torque to the torque tube urging the torque tube in a counterclockwise direction by virtue of the engaged shoulders 40 and the inner end of spring 32.

In the practice of the present invention, it has been found desirable to make the upper spring 31 somewhat larger and with more convolutions than the lower spring 32 since the actual geometry involved requires the door 20 to move upslope through an angle β approximating 123° during door opening, while the door moves upslope through an angle θ approximating only 50° during door closing. Thus, as will be most clearly indicated in FIGS. 5, 6 and 8, it will be noted that the lower spring 32 is smaller in diameter and provided with fewer convolutions than is the upper spring 31.

Figure 12:
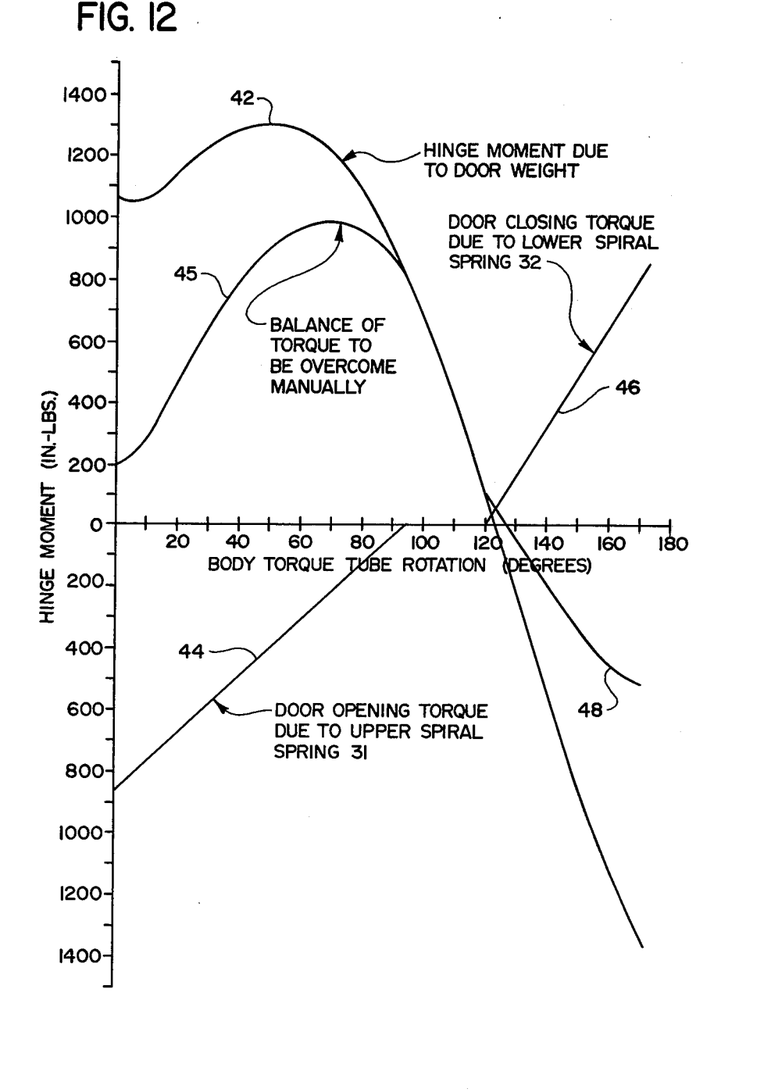

Referring next to FIG. 12, the advantages attained by the present invention will become more readily understandable. Thus, as here shown, it will be noted that the hinge moment attributable to the weight of the door 20 is represented by the curve 42. Considering the force required to overcome hinge moment during door opening movement, it will be noted that approximately 1,070 in./lbs. are initially required to initiate movement of the door 20 from a fully closed position; and, as the door progressively moves through angle β (FIG. 4), the amount of force required gradually increases throughout the first 40° to 45° of the door movement and then progressively decreases, reaching 0 in./lbs. when the door 20 reaches its highpoint—i.e., a point where the angle β (FIG. 4) is approximately 123°—at which point the door commences downward movement and the weight of the door itself provides the force necessary to fully open the door. At the same time, however, the upper spring 31 provides a linearly decreasing negative torque ranging from approximately 870 in./lbs. when the door is fully closed to 0 in./lbs when the door has moved through approximately 90° of rotational movement as indicated by curve 44. As a consequence, the resultant torque which must be overcome manually by the on-board flight attendant is substantially reduced from the hinge moment attributable to door weight as represented by the curve 42 to the resultant curve indicated at 45. Similarly, during door closing movement, the lower spring 32 provides torque represented by the curve 46 as the door moves from a fully opened position back to its highpoint, thus substantially reducing the amount of manually applied torque that must be imparted by the on-board attendant as indicated by the resultant curve 48.

Thus, those skilled in the art will appreciate that there has herein been described a simple, extremely compact, and exceedingly effective spring counterbalance system which minimizes the torque that must be imparted to the door by the on-board flight attendant during those portions of door opening and closing movement when the door is moving uphill.

What is claimed is:

1. In combination with an aircraft door of the type adapted to be shifted outwardly and inwardly to open and close an ingress/egress opening in the aircraft fuselage during door opening and closing operations, respectively, about a generally vertical but inwardly canted hinge axis defined by a torque tube mounted in said fuselage with freedom for rotation about said axis and drivingly coupled to said door by hinge link defining means, and wherein said door is required to move upwardly during the initial portion of both door opening movement and door closing movement as a direct result of pivotal door movement about said generally vertical inwardly canted hinge axis, the improvement comprising a spring operated door counterbalance hinge assembly comprising:

(a) a first convolute clock-type spring member having its outer free end rigidly secured to said fuselage and its convolutions coaxially wrapped about said torque tube in a first direction;

(b) a second convolute clock-type spring member having its outer free end rigidly secured to said fuselage and its convolutions coaxially wrapped about said torque tube in a second direction opposite to said first direction; and, (c) first and second radially projecting shoulder means formed on said torque tube and respectively separably engageable with the inner free ends of said first and second convolute spring members, said first and second shoulder means being positioned with respect to said first and second convolute spring members so that said first shoulder means engages the inner free end of said first convolute spring member during the latter portion of door-closing movement when said door is moving into said ingress/egress opening in said fuselage for winding said first convolute spring member and storing energy therein during said latter portion of door-closing movement and so that said second shoulder means engages the inner free end of said second convolute spring member during the latter portion of door-opening movement when said door is moving away from said ingress/egress opening in said fuselage for winding energy in said second convolute spring member and storing energy therein during said latter portion of door-opening movement, whereby during the initial portion of door-opening movement when said door moves outwardly and upwardly, said wound first convolute spring member unwinds to impart a counterbalance torque to said torque tube for reducing the amount of manual exertion required to pivot said door outwardly and upwardly and, during the initial portion of door-closing movement when said door is moving upwardly and away from said fuselage and towards said ingress/egress opening, said wound second convolute spring member unwinds to impart a counterbalance torque to said torque tube for reducing the amount of manual exertion required to pull said door upwardly and away from said fuselage and towards said ingress/egress opening.

2. The combination as set forth in claim 1 wherein said aircraft door is a plug-type door.

3. The combination as set forth in claim 1 wherein said inwardly canted hinge axis defines an acute included angle on the order of 10° with a vertical plane.

4. The combination as set forth in claim 1 wherein said door moves upslope through a rotational angle $\beta$ and downslope through a rotational angle $\theta$ during door-opening movement, and said door moves upslope through said angle $\theta$ and downslope through said angle $\beta$ during door-closing movement.

5. The combination as set forth in claim 4 wherein said angle $\beta$ is on the order of about 123° and said angle $\theta$ is on the order of about 50°.

6. The combination as set forth in claim 4 wherein said first spring member is wound during at least a portion of downslope rotational door movement through said angle $\beta$ for storing energy therein and said second spring member is wound during at least a portion of downslope rotational door movement through said angle $\theta$ for storing energy therein.

7. The combination as set forth in claim 6 wherein said aircraft door is a plug-type door.

8. The combination as set forth in claim 5 wherein said first spring member is larger than said second spring member.

9. The combination as set forth in claim 1 wherein said door weighs on the order of 300 pounds.

10. The combination as set forth in claim 9 wherein the amount of manually applied torque required to open a fully closed door is reduced by a factor of about "5" at the initiation of door-opening movement and is progressively reduced throughout at least two-thirds of the upslope portion of door-opening movement.

11. The combination as set forth in claim 9 wherein the amount of manually applied torque required to close a fully opened door is reduced by a factor of about "3" at the initiation of door-closing movement and is progressively reduced throughout the upslope portion of door-closing movement.

12. The combination as set forth in claim 10 wherein the amount of manually applied torque required to close a fully opened door is reduced by a factor of about "3" at the initiation of door-closing movement and is progressively reduced throughout the upslope portion of door-closing movement.

* * * * *